Nov. 9, 1954   F. A. SCHAUFELBERGER   2,694,005
SEPARATION OF NICKEL AND COBALT METAL FROM ACIDIC SOLUTION
Filed March 14, 1952
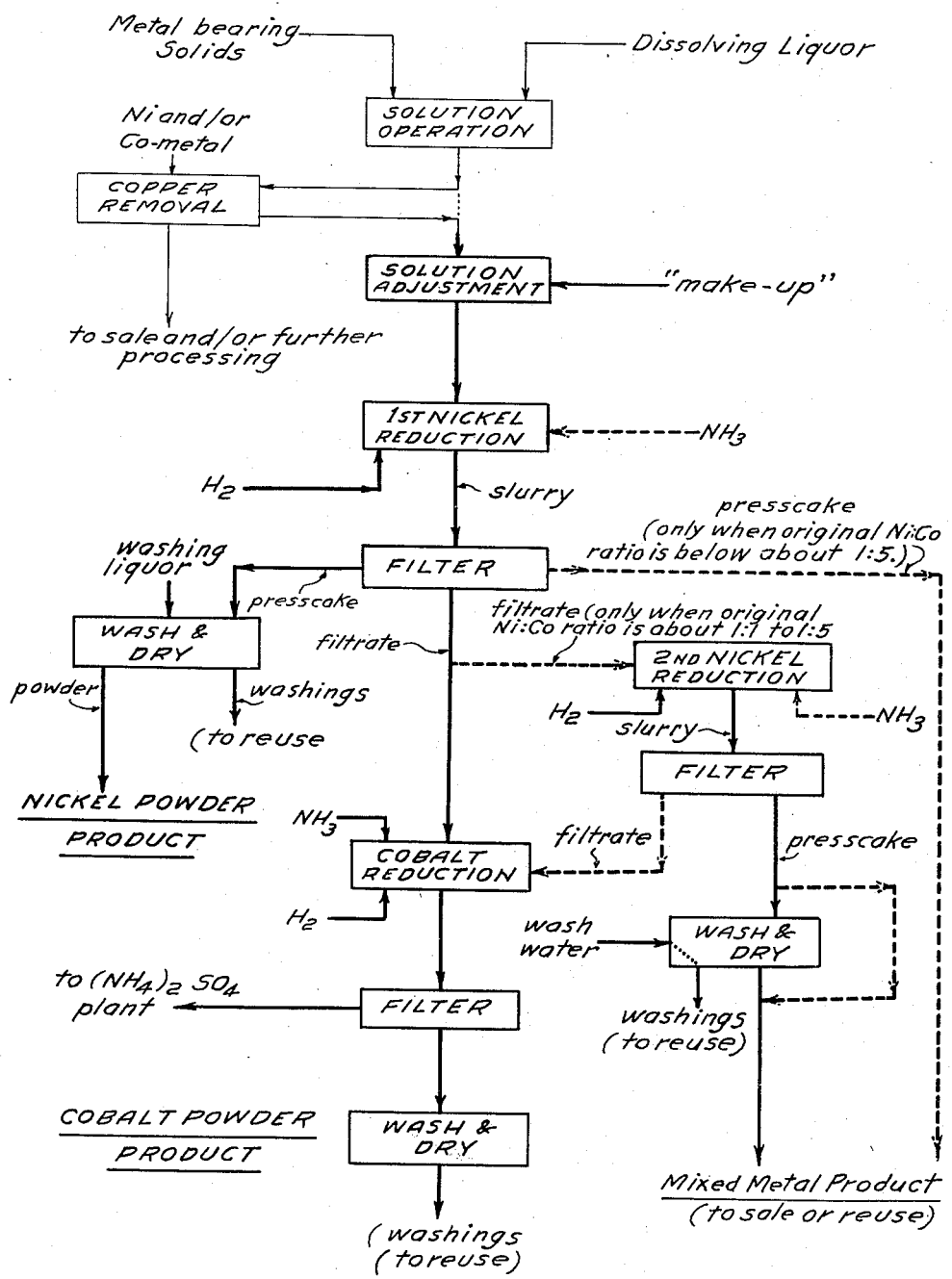
INVENTOR
FELIX A. SCHAUFELBERGER,
BY Elmer W. Harmon
ATTORNEY 2,694,005
Patented Nov. 9, 1954

2,694,005

SEPARATION OF NICKEL AND COBALT METAL FROM ACIDIC SOLUTION

Felix A. Schaufelberger, Yonkers, N. Y., assignor to Chemical Construction Corporation, New York, N. Y., a corporation of Delaware Application March 14, 1952, Serial No. 276,711

19 Claims. (Cl. 75—108)

This invention relates to the hydrometallurgy of nickel and cobalt. More specifically, it is concerned with the selective separation of cobalt and nickel from aqueous solutions containing dissolved salts of both. Still more specifically, it involves a new method capable of severally collecting cobalt and nickel as a metal powder, each substantially free of the other, from solutions containing soluble salts of both.

Nickel and cobalt metals are very similar in many physical and chemical characteristics. The same is true of their salts and naturally-occurring minerals. Moreover, minerals of both generally occur together in natural deposits and usually cannot be separated by ordinary mineral dressing practices. For these reasons, both metals are generally present, in varying amounts, in any solution resulting from any type of leaching of materials containing cobalt and nickel.

This results in many technical and economic problems. For example, in most ordinary practices, small amounts of cobalt present in nickel ore concentrates represent little of benefit to the nickel producer. Very little cobalt available in such materials is recovered and sold as such, primarily because by current methods the cost of separation equals or exceeds the additional value. Much, if not most of the cobalt is lost in the slag from nickel smelting. The remainder is sold as "nickel" in nickel metal bullion or cathodes.

Similarly, small amounts of nickel present in cobalt concentrates, and therefore, in the "cobalt" solutions after leaching, is of small value. It is generally either discarded, a considerable loss, or is recovered with the "cobalt." In the latter case, the nickel becomes an impurity in the cobalt metal and generally the producer is not paid for it. While certain nickel and cobalt mixed metals are marketable as such, it is usually at a price below the value of the pure metals in separate products.

In conventional metallurgy of nickel and cobalt, then, the presence of smaller but appreciable quantities of either in sources of the other, i. e., in ores, ore concentrates, scrap metals, plant by-products and the like, presents a serious and difficult problem. This problem has heretofore been variously attacked. However, a generally-practicable treatment whereby the bulk of each may be recovered in a separate, relatively-pure metal product has not been offered.

Many processes have been proposed for separation and recovery of cobalt and nickel from mixed electrolytes. Several have been used quite extensively. Most involve the same two facts, that cobalt is more readily oxidized to the trivalent state than is nickel and that cobaltic hydroxide is relatively more insoluble at lower pH values than is nickelous hydroxide. Unfortunately, the necessary steps are complicated and repetitive, the hydroxides are difficult to filter efficiently and the resultant separations are far from perfect. Moreover, most of them also require large quantities of chemical reagents, many of which are non-regenerative. In addition to the effect on costs, this creates a disposal problem.

Several methods of separating nickel and cobalt from ammonium carbonate leach liquors also have been proposed. In general they involve fractional distillation of the ammonium carbonate. Liquor, at different stages in the process, thereby becomes concentrated with either nickel or cobalt by precipitation of the other as hydrated oxides. Concentrated liquor is removed and treated. The precipitates must be redissolved and retreated. However, as processing methods or as to final products, these are economically and practically little better than the electrolyte treatments.

Such conventional processes for the production of nickel or cobalt products, then, are commercially unsatisfactory as too complicated, wasteful or uneconomical or as resulting in products containing undesirably large amounts of the other element. Neither do they produce saleable metals. The resultant oxides or hydroxides must be processed further to obtain this result.

It is, therefore, the principal object of this invention to provide an improved method capable of separate precipitation of cobalt and nickel from solutions containing salts of both. Such a method should not be subject to the objections to prior practice. Both metals should be economically recovered in acceptable quantity and quality. Such a process should require only the use of commonly-available chemical reagents and preferably only those which may be either regenerated or recovered in the form of valuable by-products.

Surprisingly, the desired objects of the present invention have been achieved in an effective manner in a simple, economical process. A general outline of the separation process may be simply described. An aqueous acid solution, containing cobalt, nickel and usually ammonium salts of the acid, is adjusted to the correct degree of acidity and dilution. Sulfuric acid will be the acid that is most commonly encountered. This solution is then treated with a reducing gas at elevated temperatures and controlled acidity conditions. A succession of such treatments, at differing but controlled conditions, precipitates a successive series of products which are separately collected. The first product will usually comprise high-purity nickel metal powder, the last will comprise a substantially nickel-free cobalt metal powder.

Salts, such as the sulfates, of certain metals, such as nickel or cobalt, when dissolved in water produce inherent pH conditions at which the metal cation cannot be practically reduced to metal with a reducing gas. If the solution is then partly neutralized with some non-complexing base such as sodium hydroxide, reduction to metal can be initiated. However, as the reduction proceeds the solution quickly becomes more acid and reaction stops.

In the novel procedure of my copending application with P. J. McGauley, Serial No. 276,716, filed of even date, it has been shown how this difficulty may be overcome and that a salt of either nickel or cobalt, in an acid solution free of the other, can be reduced quickly and completely to a metal powder with a gas such as hydrogen, at elevated temperatures, in the presence of a compatible electrolyte and at controlled conditions of acidity. According to the present invention, it has been found further that this reduction can be made to operate and can be controlled to selectively precipitate nickel from cobalt when salts of both are present.

In the present process, much more than the simple reduction of a single metal from solution is required. Precipitation must be of the metal itself. It must be substantially completely recovered. It must be recovered in commercially acceptable purity. It must be in useful condition, i. e., as a useful, easily-collected product and not as a deposit on the wall of the reduction vessel. It must be a powder, free from occlusions and suitable for further metallurgical use when washed and dried.

Primarily, however, the cobalt-nickel separation must be effective. The nickel product should not contain more than about 0.25–0.50% by weight of cobalt. The cobalt product usually should be equally free from nickel.

It is believed that the invention may be more readily understood with reference to the accompanying drawing. In the latter is delineated a simplified flow diagram showing one useful embodiment of the invention.

Certain factors should be noted before further discussion. The present process often may comprise a part of an overall treatment of a nickel-cobalt-copper ore. Processes are known for the elimination or recovery of such extraneous constituents as iron, arsenic, excess sulfur, insoluble gangue, zinc, lead, gold, silver and the like, therefrom. Methods are also known for leaching the resultant concentrates to convert the nickel and cobalt minerals, usually also together with any copper in the ore, to a mixture of soluble or solubilizable products, usually salts. Any of these known procedures may be the source of the materials to be treated here. Copper, if present, will constitute a valuable product. Much or all of it will have been removed before the materials come to the present process. Except to the extent that such known processees may serve as sources of the soluble or solubilizable cobalt and nickel-bearing materials to be treated here, this invention is not concerned therewith.

The nature and source of the cobalt and/or nickel-bearing materials to be treated according to the present process may be widely varied. They will, however, comprise either soluble metal salts, usually sulfates, or compounds easily converted thereto. They may be in solid form or in solution. In the latter case, some purification may be desirable, i. e., filtering, crystallization, redissolving and the like. If solids are to be dissolved, an aqueous acid is usually preferable, since, as will be seen, the nickel precipitation steps must end and will usually start under acidic conditions.

Many if not most of the ore concentrates treated in the above-noted overall process will be sulfidic. In many of the known leaching treatments sulfuric acid will be either used or formed. In such cases the products treated here will usually be sulfates. The sulfate anion is a desirable one throughout the present process. Other conventional leaching processes produce nickel or cobalt oxides, hydroxides and carbonates. These are easily taken up in sulfuric acid solutions. Where it is not already present, sulfuric acid usually is still the most practical and economical one. However, separation by selective reduction can be made using other polybasic inorganic acids such as phosphoric, fluosilic and the like whose second hydrogen ion has a low degree of ionization comparable to sulfuric. Much more care is required to prevent metal salts of these acids from coming out of solution. Highly ionizable monobasic inorganic acids such as nitric and the hydrohalides are not usefully operable in the present process. Certain monobasic organic acids such as formic and acetic may be used. Formic acid may be used, at least in part, as a reducing agent. Sulfuric acid, however, will be taken as illustrative, in this discussion as being that most used and economical.

Where in the present specification and claims the terms "free acid" or "uncombined acid" are used they refer to the stoichiometric excess of anions over the sum of the metal and the ammonium cations. Unless otherwise noted, they will refer to sulfate ions. Similarly, where hydrogen ion concentration at stated strengths of acid or "free acid" the hydrogen ion concentration of aqueous sulfuric acid of the stated strength is intended.

The "solution operation" shown, in the flowsheet, therefore, may be done specifically for this process or may have occurred in some prior treatment. The actual formation of the solution to be treated, except as to the adjustment of its dissolved content, does not constitute a patentable feature of the invention and therefore has been indicated in light lines in the drawing.

Since, as noted, the prior treatment may have involved a copper recovery, there may be some residual copper in the salts, or solution of salts, coming to this process. If so, it should be removed from solution prior to cobalt and nickel recovery. This may be done in any desired manner. One of the simplest and most economical methods, where, as here, but little need be removed, is to cement out the copper. A metal which will not contaminate the nickel and/or cobalt products should be used for replacement. Nickel and/or cobalt produced in a prior cycle may be used. Any metal so used will be recovered in this cycle without loss. Copper removal, then, except as to the possible use of cobalt and/or nickel therein, also is not a necessary feature of the present process. If not required, it may be by-passed, as shown. Accordingly, it, too, has been shown in light lines.

The first particular step in the process of the present invention is designated as a "solution adjustment." This will include any necessary adjustment of the salt concentrations and proportions in solution and the acidic content of the liquor to obtain optimum initial conditions. However, instead of using conditions optimum for complete precipitation of metal, either cobalt or nickel, as when one is present as the only dissolved metal, the optimum conditions here must be favorable to cobalt retention and they must be maintained while precipitating nickel.

This solution adjustment must therefore accomplish a number of functions. First, it should insure so far as possible retaining the cobalt and nickel in solution until they are to be precipitated as metals. Secondly, it should establish conditions under which selective gaseous reduction of nickel from cobalt can be initiated. Third, it should provide for continuing the nickel reduction once it is initiated. Fourth, it should provide for proper terminal conditions for the nickel reduction. Fifth, it should provide for substantially complete cobalt retention until and at terminal conditions.

As to keeping the nickel and cobalt from premature precipitation, several factors are important. The cobalt must be in solution at the end of the nickel reduction. The nickel, if precipitated before the gaseous reduction, is unlikely to be in the form of elemental nickel. Even if reduced to the latter state from suspension as a solid nickel compound, the product is apt to be in an unsatisfactory physical condition. Were is not for these factors, adjustment would simply be to those values at which the terminal conditions would be correct.

To accomplish the intended results of the solution adjustment then, it is necessary to do several things. First, the acidity must be adjusted to provide a minimum hydrogen ion content at which cobalt is not normally gas reducible. Secondly, since this will correspond to an acid content higher than the limiting acid conditions at which ($Ni^{++}$) ions are apparently reducible directly to elemental metal from solutions of a nickel salt in water, there must be added some material capable of forming a nickel complex, reducible at the hydrogen ion content necessary to keep cobalt in solution. Finally, it is necessary to provide some material capable of taking up the hydrogen ions found as elemental nickel is produced and thereby prevent the acidity from becoming high enough to stop the reduction of nickel prematurely.

In the present discussion material added to assist in reducing the nickel will be referred to as a "compatible electrolyte"; that added for purposes of acidity control will be referred to as an "acid-neutralizing" agent.

In the present process, controlled conditions of acidity, initially, during reduction, and terminally are highly important. Because the source of the solution may have been so varied, it will often contain an excessive amount of sulfuric acid, which must be neutralized. Alkaline-earth metals are not suitable because of the insolubility of their sulfates. Alkali metal and ammonium hydroxides are highly suitable. Ammonia, however, is the most practical since it either may be recovered as a saleable sulfate or easily recovered for reuse, whichever is preferable. For the generally encountered case, then, ammonia is the most desirable neutralizing agent. As such, it will be taken as illustrative.

The term "compatible electrolyte" as used herein is intended to designate an acid or a salt meeting several certain requirements. First, it must furnish an anion capable of forming a gas-reducible complex with nickel. Secondly, it must be soluble in the solution without causing a premature precipitation or crystallization of any dissolved component. This necessitates its being compatible with all of the dissolved components. In the illustrative case of sulfates solutions sulfuric acid itself or salts formed in neutralizing an excess of it or sodium, potassium, and ammonium sulfates may serve the purpose. Although, as will be noted, other acids may be present, since sulfuric acid is the most used acid and ammonia the most useful neutralizing agent, ammonium sulfate will constitute the most practical electrolyte. It is readily available as needed since it is a normal product of the illustrative process.

The function of the electrolyte is not certain in view of this variety of suitable compounds. It may be that in the presence of the acid, an anion complex such as $Me(A)_x$ wherein Me is nickel or cobalt and An is the anion radical may form and be more easily reduced than the metal ion. It may be that the increase in anions in solution due to its presence is such that for the acid dissociation constants the anticipated increase in hydrogen ions cannot occur, i. e., most of the hydrogen ions formed during reduction are converted to a less dissociated ion or undissociated acid molecules. It may be a combination of these and other factors. However, ammonium sulfate, as a salt of a dibasic acid which itself has a relatively low dissociation as to the first hydrogen, appears to fit in all the categories.

It should be noted that the terminal conditions for any metal precipitation step in the present separation process are the critical conditions for that step. Accordingly, the "solution adjustment" is an adjustment made for the purpose of insuring the correct conditions when the metal precipitation approaches completion. Any adjustment is therefore to certain initial conditions which, with allowance for the formation of acid during metal reduction, produces the necessary end result.

Where, as here, more than one metal precipitation step will be used, there are several possibilities. The first solution adjustment step in some cases may be one which will allow for production of satisfactory terminal conditions at the end of all the precipitation steps. Preferably, however, it will be an adjustment calculated to produce the optimum conditions at the end of the first metal precipitation. In such cases further adjustments can be made between subsequent precipitation steps. It is also quite possible, particularly where a large quantity of metal is to be precipitated in the first precipitation step, to adjust the solution to good staring conditions and make a further adjustment during the step.

There will be little or no cobalt precipitation above about 1.5% free acid even when cobalt is present in large amounts. Nickel will precipitate completely for all practical purposes at any acidity up to about 1% acid and in decreasing yields up to about 5% acid. Although the lower the acidity the more complete the nickel removal, care must be taken to insure against premature cobalt precipitation in obtaining a good nickel yield. Accordingly, there is for any stated Ni:Co mol ratio in solution, some optimum condition of acidity which should be achieved for most complete nickel precipitation free of cobalt.

Not only is the Ni:Co ratio important in determining the optimum acidity but also as to several factors. Another, for example, is the metals concentration in the solution. It can be expressed readily as total grams per liter of Ni plus Co metal in solution. However, the optimum total will vary with the Ni:Co ratio in the solution. If the ratio is above 5:1, 50–60 grams per liter is about the optimum. This will decrease to about 40–45 grams at 1:1 ratios; 35–40 at 1:5 and about 30 at lower ratios. As will be discussed, ratios below about 1:10 will seldom be treated to obtain a first nickel precipitate as such a product would be very small, if not negligible.

Accordingly, in the solution adjustment step "makeup," i. e., metal sulfates and/or ammonium sulfate and/or ammonia and/or sulfuric acid and, if necessary, water are added to bring the solution to the desired optimums of acidity, concentration and proportions.

The next step may be designated as the first nickel precipitation. Herein, the solution, adjusted as noted above, is treated under reducing conditions. Temperatures above 250° F. are required and above about 300° F. are needed to complete the cycle in a reasonable time. On the other hand, excessive temperatures not only militate against cobalt retention but require the use of pressures above about 1000 pounds per sq. in. They are not necessary and unduly increase the apparatus requirements. Therefore, while temperatures up to about 500° F. may be used in these and subsequent cycles, about 300°–400° F. is preferable in this step.

A reducing gas, to be suitable, must be non-sulfidizing. Hydrogen, carbon monoxide and mixtures of them may be used. Diluent inert gases do not harm except to unduly increase the requisite total pressures. If possible, they should be avoided. Carbon monoxide under the acidic conditions here forms carbon dioxide which dilutes the reducing gas and may limit the reaction. Hydrogen, where available, is definitely preferable. It may be added above or below the liquid surface during treatment.

If uncontrolled, the acid content will rise during reduction. Since nickel reduction is slow above about one percent free acid content, it is best that some neutralizing agent be added during the "solution adjustment" if the original solution contains acid in excess of these amounts. On the other hand, adding enough ammonia to insure a desirable final acid content would in many cases make the original acid content low enough to permit excessive coprecipitation of cobalt. In those circumstances, in addition to the reducing gas some neutralizing agent may be added during reduction. While other agents may be used, ammonia again is usually preferable. Usually, therefore, at least some ammonia is added during reduction as is shown. However, since there is a possibility that none may be needed, the addition is shown as a dotted line.

Ammonia is preferably used as a gas. While aqua ammonia may be used, it reduces the apparatus capacity. The total amount available should be such that at the end of the nickel reduction cycle, the acid content will be at the optimum "cut-off" value. As noted above, this is the optimum acid content at which maximum-nickel minimum-cobalt precipitation occurs. Like the optimum metal concentration, the cut-off acidity will vary with the original Ni:Co mol ratio. It varies in the range 0.2–1.0% acidity. From about 99% to 100% of the nickel at a 5:1 ratio or higher, and 95–99% at about 1:1 can be precipitated containing substantially no cobalt under these conditions. The nickel can be precipitated without an excessive cobalt content under these conditions. These figures, those previously given, and others, are summarized in the following Table I.

Reduction in this and subsequent steps may be either continuous or batchwise, using controlled content solutions and conditions. In batchwise operation a timed cycle may be used. For any given solution a few trial runs will determine a time cycle which will stop reduction before the cobalt content of the nickel powder becomes sufficient to be uneconomical. For continuous operations, a few initial adjustments will establish the conditions at which the necessary solution feed rate may be maintained and the desired recovery obtained. In some cases, however, a particular mixture may be desired for making certain alloys. In that case, a higher cobalt content can be permitted up to the desired one.

The metal precipitate is filtered out, washed and dried, as shown. Any solids-liquid separation step may be substituted for the filtering operation. Washing and drying are conventional. Preferably, at least the finish of the drying should be carried out in a reducing atmosphere. The product will be nickel in high purity.

The washings, while dilute, contain valuable materials. These are recovered as by recycling; crystallizing of the salts content and the like. These may be done in conventional manners and therefore their exact operations form no part of the present invention.

After removal of this product, in the illustrative case of Ni:Co ratios of about 1:1 and higher, the filtrate is sent to a cobalt reduction, as shown. Herein, under conditions ranging from those only slightly less acidic than in the first stage on into basic conditions, in a similar cycle, cobalt salt is reduced to cobalt metal in a nearly pure state, i. e., of a grade saleable as such.

The acid content of the solution during this reduction should be less than 0.5% in any case. Preferably, it should be at a pH considerably higher than the cut-off value in the first reduction. Where ammonia is used, the solution may even be slightly basic, since at pH's above about neutrality, an ammine complex begins to form and reduction to Co metal can also be carried quite readily from that form. A temperature a little higher than for the nickel reduction is usually advantageous. Above about 300° F. is needed, above 350° F. is better and about 405°–450° F. is a good practice. Temperatures above 500° F. may be used but are not needed. Apart from the unnecessarily high vapor pressure developed, solubilities of the cobalt salts decrease rapidly in the increasing temperature.

Cobalt powder is collected, washed and dried in a manner similar to the preceding product. The washings, too, are similarly processed. However, the filtrate, while substantially barren of cobalt and nickel, cannot be directly discarded because of its ammonium sulfate content. Therefore it is sent to some conventional circuit wherein ammonium sulfate is crystallized in some conventional manner as by water removal. The exact method of ammonia recovery or recycling is not a feature of the present invention and has not been shown.

Two different cases must be considered when it is desirable to extend the range of Ni:Co ratios which must be treated in the original feed sources. For Ni:Co mol ratios of from about 1:1 down to about 1:5, it is better to take the operation in three stages, as shown in the drawing.

For feed materials having these ratios, precipitation of the entire Ni content in the first stage would usually result in an excessive Co content therein. A proper dilution is selected, usually not more than about 40 grams per liter of total Co plus Ni in solution. At the same time, a proper cut-off acidity value is selected, usually between about 0.5%–1.0% sulfuric acid.

This solution is then subjected to a first nickel reduction step under similar conditions to those noted above. Reduction is controlled by timing and/or by controlling the end point acidity to some optimum cut-off value, usually at or above the 0.5% at which all cobalt is retained. In any case, reduction is stopped before the cobalt content in the product reaches the economically undesirable limit. This product is filtered, washed, dried, etc., exactly as for the nickel product discussed above.

However, the filtrate, instead of passing to a cobalt precipitation, is sent to a second nickel reduction step. This is indicated by the dotted line in the drawing. In this second nickel reduction, the reducing conditions, except for the degree of acidity, are like those of the first stage. Here, however, the final acidity is controlled to the point at which substantially all the Ni will be stripped from solution with the optimum cobalt retention. This acid concentration for differing metal ratios will also vary somewhat but will be close to the 0.5% value. End point control is preferably accomplished by adding $NH_3$ to the necessary degree preferably before raising the temperature. Reduction is then stopped and again the product is collected, washed and dried, as discussed above for the first product. The residual solution, as shown, is sent to the cobalt reduction step where it is treated as was discussed above.

A third type of situation is involved where the original Ni:Co mol ratios are from about 1:5 to 1:10 and lower. For such solutions, the process is again best carried out in two stages. For such concentrates, an attempt to take a first high-purity Ni product would, at best, yield only a small quantity. The middlings or second stage product would be very large in proportion. It is best, therefore, to take all the nickel as a middlings in the first nickel reduction. The flow, however, will be much the same as that shown in the drawing for the first type of case. It is also noted in Table I.

Although only two stages are used, all the nickel is precipitated in the first stage and the product will be mixed metal as in the three-stage middlings product discussed above. The Ni:Co ratio in such products will be some 3 to 10 times that in the original feed. Such a "mixed metal" product, on recycling, will give a good yield of pure nickel in a two-stage or a three-stage, depending upon the Ni:Co ratio, operation such as has been discussed.

Since this product does correspond roughly to the middlings product, reduction is carried out under the conditions therefor which were pointed out above. Reduction is carried to a cut-off acidity at which substantially all the nickel will have been reduced with a minimum cobalt content. This product is then removed and the residual solution treated for cobalt reduction, as already shown and discussed.

The efficacy of the separation is shown in the following examples, given for purposes of illustration. Except as noted, all parts are in mols per liter and percentages are by weight.

EXAMPLE 1

A solution was prepared by dissolving in 0.2% aqueous sulfuric acid about 0.5 parts of ammonium sulfate and 0.75 part of a crystal mixture of cobalt and nickel sulfates having a nickel:cobalt mol ratio of about 1:1. This solution was transferred to a stirred autoclave, heated to about 400° F. and the pressure raised to about 800 pounds per sq. in. with hydrogen. Sufficient $NH_3$ to leave, after reduction, about 0.5% free acid was added during reduction. After about 30 minutes, treatment stopped, the pressure relieved and the solids collected. No middling product was taken. The filtrate was retreated under similar temperature and pressure conditions after neutralization of the free acid with added ammonia. In the first product the nickel powder contained about 2.5% cobalt. In the second about 97% of the original cobalt was obtained containing 2.3% nickel. Both are saleable products, but both are higher in the other metal than is completely satisfactory.

EXAMPLE 2

In order to show the effect of final acid content and differing Ni:Co ratios, the nickel precipitation step of Example 1 was repeated several times on similar crystal mixtures of varying Ni:Co ratios. Reduction was carried out to differing cut-off acid values. Reduction was carried to the point at which the cobalt content became about 0.5%. Illustrative results are shown in Table II.

TABLE II

| Original Ni:Co Content | | | Ni Product | | Cut-Off Acidity, Percent Free Acid |
|---|---|---|---|---|---|
| Mol Ratio | Gm./Lt. | | Average Yield, Percent Original Ni | Average Content, Percent Co in Product | |
| Ni:Co | Ni | Co | | | |
| 20:1 | 60 | 3 | 99.7 | 0.2 | 0.2 |
| 3:1 | 36 | 12 | 99 | 0.5 | 0.5 |
| 2:1 | 30 | 15 | 97 | 0.5 | 0.6 |
| 1:1 | 20 | 20 | 95 | 0.5 | 0.7 |
| 1:2 | 13 | 26 | 83 | 0.5 | 1.0 |
| 1:4 | 7 | 28 | 63 | 0.5 | 1:1 |
| 1:15 | 2.2 | 33 | (¹) 0 | | |

¹ Note.—At this ratio no attempt is made to obtain a nickel product, all nickel being taken as a middling—see Table III.

EXAMPLE 3

The residual solutions obtained in the last six tests in Example 2 were stripped of nickel by similar reductions, carried to various end-point acid values. Illustrative results are shown in Table III. The cobalt content of these "middling" products containing the residual nickel is indicated.

TABLE I

*Effect of Ni:Co ratio on conditions and results*

| Ni:Co Ratio | Total Gms./Lt. Ni & Co Salts (Optimum) | No. of Stages | 1st Stage | | | | 2nd Stage | 3rd Stage | |
|---|---|---|---|---|---|---|---|---|---|
| | | | Percent "free" Acid at Cut-Off | Gr./Lt. of Ni in Filtrate | Yield, Percent Ni in 1st Stage | Content, Percent Ni in Ni Product | Content (Percent Ni in Middlings) | Yield ¹ (Percent Co in Co Stage) | Percent Ni in Co Product |
| 10:1 | Up to 60 | 2 | 0.20 | .2 | 99.6 | 99.5+ | None taken | 96+ | 2–5 |
| 5:1 | Up to 50 | 2 | 0.13 | .5 | 99.0 | 99.0+ | | 97 | 5 |
| 1:1 | Up to 40 | 3 | 0.5–1.0 | 1.0 | 95 | 99.0+ | 20–40 | 65–75 | 0.6 |
| | | 2 | 0.5 | .5 | 97.5 | 97.0 | None taken | 90–100 | 2–5 |
| 1:5 | Up to 40 | 3 | 0.5–1.0 | 1.5–2.0 | 70–80 | 97.0 | 10–40 | 60–80 | .5 |
| 1:20 | Up to 30 | 2 | 0.1–0.5 | .2 | 80–90 | | ² 20–40 | 50–70 | .5 |

¹ Note.—Average percent of overall content before first reduction.
² Note.—For this ratio, the product is a mixed metal, taken in the first stage.

TABLE III

| Original Ni:Co Mol Ratio | Average Yield, Percent of Original | |
|---|---|---|
| | Ni | Co |
| 3:1 | 0.8 | 5 |
| 2:1 | 2.7 | 19 |
| 1:1 | 5.1 | 22 |
| 1:2 | 16 | 27 |
| 1:4 | 33 | 30 |
| 1:15 | 90 | 40 |

EXAMPLE 4

The residual liquors from Example 3 were subjected to a cobalt precipitation, as in Example 1. Illustrative results are shown in Table IV.

TABLE IV

| Original Ni:Co Mol Ratio | Average Yield, Percent of Original Co | Average Content, Percent Ni in Product |
|---|---|---|
| 3:1 | 94 | 0.5 |
| 2:1 | 80 | |
| 1:1 | 77 | |
| 1:2 | 72 | |
| 1:4 | 69 | |
| 1:15 | 59 | |

Although it does not form part of the present invention, use of seed metal powder in the metal precipitation steps is highly advantageous. Its effect is definite, somewhat catalytic, even though its mode of operation is uncertain. A good yield with no tendency to foil formation and deposition on the vessel is obtained.

Use of powder is particularly helpful in the case of nickel. When used, it should be finely divided, below 40 mesh and preferably below about 150 mesh.

It may be used in large amounts, since it represents no loss. As much should be used as is convenient, up to the amount which can be well dispersed and suspended by the agitator with which the vessel should be equipped. This may be a weight equal to the amount of metal precipitated or even several times this weight. A useful possibility lies in using it to absorb the reducing gas before actual metal reduction. This serves two useful functions.

It provides a method of selectively removing hydrogen, for example, from a gas mixture so that inert gases need not be added to the pressure vessel and lower total pressures may be used. In addition, by absorbing a definite amount it provides a control of the amount of metal precipitated.

Other electrolytes than ammonium sulfate may be employed. These would include, as noted above, sulfates such as the alkali metal sulfates and the alkali and ammonium salts of suitable acids, such as formic and acetic. So long as the hydrogen ion concentration and/or activity is kept from increasing, during metal reduction, without causing any extraneous precipitate, any "compatible electrolyte" as defined above may be used.

As noted above, the separation capabilities of a suitable process must extend to the production of cobalt and nickel products containing less than 0.5% by weight of the other. The present process can be utilized to make products of this and better purity. The foregoing discussions have established the necessary conditions to obtain such results.

However, in some cases it may be permissible, provided the market is available, or for reason of economy on difficult concentrates to produce products of lesser purities. In such cases the Ni:Co ratio is still important. However, the optimum cut off acid values, i. e., the hydrogen ion control, need not be so strictly limited. The effect of such variations on some materials may be illustrated as in the following Table V. Such figures must, however, be approximations due to concentration variations for the various possible solutes.

TABLE V

*First step nickel reduction*

| Original Solution | | Purity (percent Co in Ni) and yield of Ni reduction (percent) vx. Terminal acid concentration (percent H₂SO₄) | | | | | | | |
|---|---|---|---|---|---|---|---|---|---|
| Mol Ratio Ni:Co | Content, gm/liter Ni:Co | .5% Co in Ni | | 1% Co in Ni | | 2.5% Co in Ni | | 5% Co in Ni | |
| | | $H_2SO_4$, Percent | Yield, Percent | $H_2SO_4$, Percent | Yield, Percent | $H_2SO_4$, Percent | Yield, Percent | $H_2SO_4$, Percent | Yield, Percent |
| 10:1 | 60 \| 6 | ¹.15 | (100) | .12 | (100) | .08 | (100) | .03 | (100) |
| 5:1 | 45 \| 9 | ².25 | (100) | .23 | (100) | .20 | (100) | .17 | (100) |
| 1:1 | 20 \| 20 | .70 | 95 | .68 | (95–96) | .66 | (95–96) | .60 | 96 |
| 1:7 | 4 \| 28 | (1.0+) | 40–45 | | | | | (1.0−) | 40–60 |
| 1:20 | 1.5 \| 30 | not possible | | not possible | | not possible | | not possible | |

Note.—When it makes no sense to indicate higher accuracy, figures are put in brackets.
¹ Even at .30% acidity 100% of Ni precipitated, but at higher purity.
² At .40% acidity, no cobalt should yet be precipitated up to 0.5 gr Ni/lt. may be left unreduced.

In order to obtain in the last step by stripping the solution 100% cobalt powder of the following nickel content in the indicated yield, the previous reduction step (1st or 2nd middling) has to terminate at the acid concentrations shown in the following table:

TABLE VI

*Third step Co reduction*

| Original solution | | .5% Ni in Co | | 1% Ni in Co | | 2.5% Ni in Co | | 5% Ni in Co | |
|---|---|---|---|---|---|---|---|---|---|
| Mol Ratio Ni:Co | Content, gm/liter Ni:Co | $H_2SO_4$, Percent | yield, Percent | $H_2SO_4$, Percent | yield, Percent | $H_2SO_4$, Percent | yield, Percent | $H_2SO_4$, Percent | yield, Percent |
| 10:1 | 60 \| 6 | 0.30 | (100) | 0.40 | (100) | 0.45 | (100) | 0.50 | (100) |
| 5:1 | 45 \| 9 | 0.40 | (100) | 0.45 | (100) | 0.50 | (100) | 0.55 | (100) |
| 1:1 | 20 \| 20 | (0.45) | 75+ | (0.50) | 80+ | (0.55) | 85+ | 0.65 | (95–100) |
| 1:7 | 4 \| 28 | (0.45) | 60–75 | (0.50) | (65–80) | (0.55) | (70–90) | 0.70 | 90 |
| 1:20 | 1.5 \| 30 | (0.45) | 50–70 | (0.50) | (60–75) | (0.55) | 65–80 | .75 | (80) |

I claim:

1. In the hydrometallurgical separation of high-purity cobalt from substantially copper- and iron-free acidic solutions containing cobalt and nickel; the steps of: adjusting the hydrogen ion concentration to acidic conditions less than that equivalent to about a free acid content of 5%; heating adjusted solution, to temperatures above about 250° F., in the presence of a non-sulfidizing reducing gas and a compatible electrolyte the anion of which is capable of forming a gas-reducible anion complex with nickel ions whereby nickel is reduced to nickel metal; continuing the reduction in the presence of a sufficient amount of a soluble salt-forming acid-neutralizing agent to produce, after reduction, a hydrogen ion concentration ranging from that equivalent to a free acid content of from about 0.1–0.2% for original Ni:Co mol ratios of about 5:1 and higher to that of about a 1.0% solution for original Ni:Co ratios of 1:1 to 1:10, until nickel precipitation substantially ceases and removing precipitate, whereby a solution suitable for cobalt metal precipitation is obtained.

2. A process according to claim 1 in which the solution, after said initial hydrogen ion adjustment, contains at least 0.2 mols per liter of ammonium sulfate.

3. A process according to claim 1 in which the acid is sulfuric.

4. A process according to claim 1 in which neutralizing agent is ammonia.

5. A process according to claim 1 in which the soluble salt formed is ammonium sulfate.

6. A process according to claim 1 in which acid is sulfuric, the neutralizing agent is ammonia and the soluble salt formed is ammonium sulfate.

7. In the hydrometallurgical separation of high-purity nickel and cobalt from substantially copper- and iron-free acidic solutions containing nickel and cobalt in the mol ratios of from about 3:1 to about 1:5, the steps of: adjusting the hydrogen ion concentration to acid conditions less than that equivalent to about a free acid content of 5%; heating the adjusted solution to temperatures above about 250° F., in the presence of a non-sulfidizing reducing gas and a compatible electrolyte the anion of which is capable of forming a gas-reducible anion complex with nickel ions whereby nickel is reduced to metallic nickel; continuing the reduction in the presence of a sufficient amount of a soluble salt-forming acid-neutralizing agent to produce, after reduction, a hydrogen ion concentration equivalent to a free acid content of about 0.5%; continuing the reduction until nickel precipitation substantially ceases; collecting precipitate as high-grade nickel product; again heating the residual solution under substantially similar reducing conditions until nickel precipitation is substantially complete in the presence of the increased amount of acid-neutralizing agent sufficient to reduce the hydrogen ion content, after reduction, to that equivalent of from a free acid content of about 0.2% for a 1:1 ratio to about that of a free acid content of about 0.3% for a 1:5 and lower ratio, and removing any precipitate, whereby a solution suitable for cobalt metal precipitation is obtained.

8. A process according to claim 7 in which the solution, after adjustment, contains at least 0.2 mol per liter of ammonium sulfate.

9. A process according to claim 7 in which acid is sulfuric.

10. A process according to claim 7 in which neutralizing agent is ammonia.

11. A process according to claim 7 in which the soluble salt material is ammonium sulfate.

12. A process according to claim 7 in which the acid is sulfuric, the neutralizing agent is ammonia and the soluble salt is ammonium sulfate.

13. In the hydrometallurgical separation of high-purity nickel containing not more than about 2.5% cobalt from substantially copper- and iron-free acidic solutions containing nickel and cobalt in mol ratios of about 1:1 and higher, the steps of: adjusting the hydrogen ion content to acidic conditions less than that equivalent to about a free acid content of 5%; heating the adjusted solution, to temperatures above about 250° F., in the presence of a non-sulfidizing reducing gas and a compatible electrolyte the anion of which is capable of forming a gas-reducible anion complex with nickel ions whereby nickel is reduced to nickel metal in the presence of a sufficient amount of a soluble salt-forming acid-neutralizing agent to produce, after reduction, a hydrogen ion content not less than that equivalent to a free acid content of about 0.5% for a 1:1 ratio down to about neutral conditions for a 20:1 ratio; continuing the reduction until nickel precipitation substantially ceases and collecting precipitated nickel.

14. A process according to claim 13 in which the solution, after adjustment, contains at least 0.2 mols per liter of ammonium sulfate.

15. A process according to claim 13 in which acid is sulfuric.

16. A process according to claim 13 in which neutralizing agent is ammonia.

17. A process according to claim 13 in which the soluble salt formed is ammonium sulfate.

18. A process according to claim 13 in which the acid is sulfuric, the neutralizing agent is ammonia and the soluble salt formed is ammonium sulfate.

19. A process according to claim 13 in which the product contains not more than 0.5% cobalt and the hydrogen ion contents range from that of a 0.7% acid solution for a 1:1 ratio down to about a 0.1% acid solution for ratios of 20:1 and higher.

References Cited in the file of this patent

UNITED STATES PATENTS

| Number | Name | Date |
|---|---|---|
| 1,686,391 | Muller et al. | Oct. 2, 1928 |

OTHER REFERENCES

Metall u. Erz, 30, 449–455 (1933).